(12) United States Patent
Hawley

(10) Patent No.: US 7,025,174 B1
(45) Date of Patent: Apr. 11, 2006

(54) TRUCK LADDER

(76) Inventor: James K. Hawley, 705 New Bedford Rd., West Middlesex, PA (US) 16159

( * ) Notice: Subject to any disclaimer, the term of this patent is extended or adjusted under 35 U.S.C. 154(b) by 24 days.

(21) Appl. No.: 10/644,254

(22) Filed: Aug. 20, 2003

(51) Int. Cl.
 *E06C 5/00* (2006.01)
(52) U.S. Cl. ............................ 182/88; 182/84; 182/127
(58) Field of Classification Search ................ 182/88, 182/127, 95, 97, 106, 113, 83–86; 280/166
 See application file for complete search history.

(56) References Cited

U.S. PATENT DOCUMENTS

| 1,148,356 A | * | 7/1915 | Chickering ................... 182/88 |
| 2,779,525 A | * | 1/1957 | Vogel ............................ 182/88 |
| 3,008,533 A | * | 11/1961 | Haberle ........................ 182/88 |
| 3,083,784 A | * | 4/1963 | Urian ............................ 182/88 |
| 3,645,557 A | * | 2/1972 | Aldropp et al. ............. 280/166 |
| 4,139,078 A | | 2/1979 | Keller |
| 4,205,862 A | | 6/1980 | Tarvin |
| 5,024,292 A | | 6/1991 | Gilbreath et al. |
| 5,046,582 A | | 9/1991 | Albrecht |
| 5,228,707 A | * | 7/1993 | Yoder .......................... 280/166 |
| 5,964,317 A | | 10/1999 | Lattavo |
| 6,173,812 B1 | * | 1/2001 | Spivey et al. ................. 182/88 |

OTHER PUBLICATIONS

Exhibit A—The Jeremiah Foundation, Inc. Exhibit B—The Nehemiah Program Exhibit C—The Ameridream Charity, Inc.

* cited by examiner

*Primary Examiner*—Alvin Chin-Shue
(74) *Attorney, Agent, or Firm*—Harpman & Harpman

(57) ABSTRACT

A truck ladder assembly for attachment to the underside of a truck trailer bed having a deployable ladder portion slidable from a folded storage position to an extended operational position in which the ladder portion defines a landing in spaced extended relation from the truck bed with extensible hand rails extending there from. The truck ladder is selectively secured to the underside of the trailer bed allowing for multiple repositioning and deployment of the ladder assembly.

5 Claims, 12 Drawing Sheets

TRUCK LADDER

BACKGROUND OF THE INVENTION

1. Technical Field

This device relates to truck ladders specifically ladders that are used to provide access to the truck trailer bed. Such trailer beds are located a substantial distance from the ground making access difficult without the aid of some sort of ladder. Many times truck drivers use makeshift ladders that they carry along with them that are used in all types of weather to climb up to the trailer bed. Such ladders are unstable and inherently unsafe accounting for many accidental injuries and falls.

2. Description of Prior Art

Prior art devices of this type have been developed to address the safety and ease of access issue by providing a number of portable and permanent ladder assemblies for use on truck trailers, see for example U.S. Pat. Nos. 4,139,078, 4,205,862, 5,024,292, 5,046,582, and 5,964,317. In U.S. Pat. No. 4,139,078 a ladder assembly is disclosed for use on a truck trailer having a rail and rung ladder with which is split in guide tracks up under the trailer and held by an elastic retaining strap when not in use.

U.S. Pat. No. 4,205,862 is directed to a truck ladder having a folding three rung portion that pivotally extends down from a support and mounting frame secured to the truck bed.

U.S. Pat. No. 5,024,292 illustrates a portable ladder assembly for truck trailers with mounting sleeves secured to the trailer into which telescopically extensible rail members are selectively secured, rungs extend between the rails and a ladder extension optionally extends there from.

U.S. Pat. No. 5,046,582 claims a portable ladder for truck cargo carrier assemblies in which multiple rung ladder portions pivotally extend from a hand rail portion which in turn is pivotally secured to the cargo opening of a truck trailer.

U.S. Pat. No. 5,964,317 shows a portable ladder for truck trailers having a single center rail with staggered oppositely disposed steps extending there from. A mounting bracket is selectively secured on the trailer bed surface with a central rail post secured thereto. The upper portion of the rail post that extends above the trailer surface acts as a hand rail of sorts.

Other prior art can be seen in Exhibit A in which a Chevron brand retractable ladder for tow trucks is shown having a pivotal adjustment ladder assembly.

In prior art Exhibit B a Pro Step Trucker brand ladder assembly is shown on the web page printout having a fixed open rail ladder which is hooked over the support edge of a truck trailer. A pair of ladder hand railing pivots to extend to an upstanding position.

SUMMARY OF THE INVENTION

A truck trailer ladder assembly of the invention includes an under mounted movable deployable access ladder having a support and storage position selectively secured to the underside of a trailer bed with a movable landing and folding ladder portion extending there from. The landing portion stores and supports the folded ladder and has a pair of folded full extension hand rails for safe and secure access up to and down from the truck trailer.

DESCRIPTION OF THE PREFERRED EMBODIMENT

Figure 1:
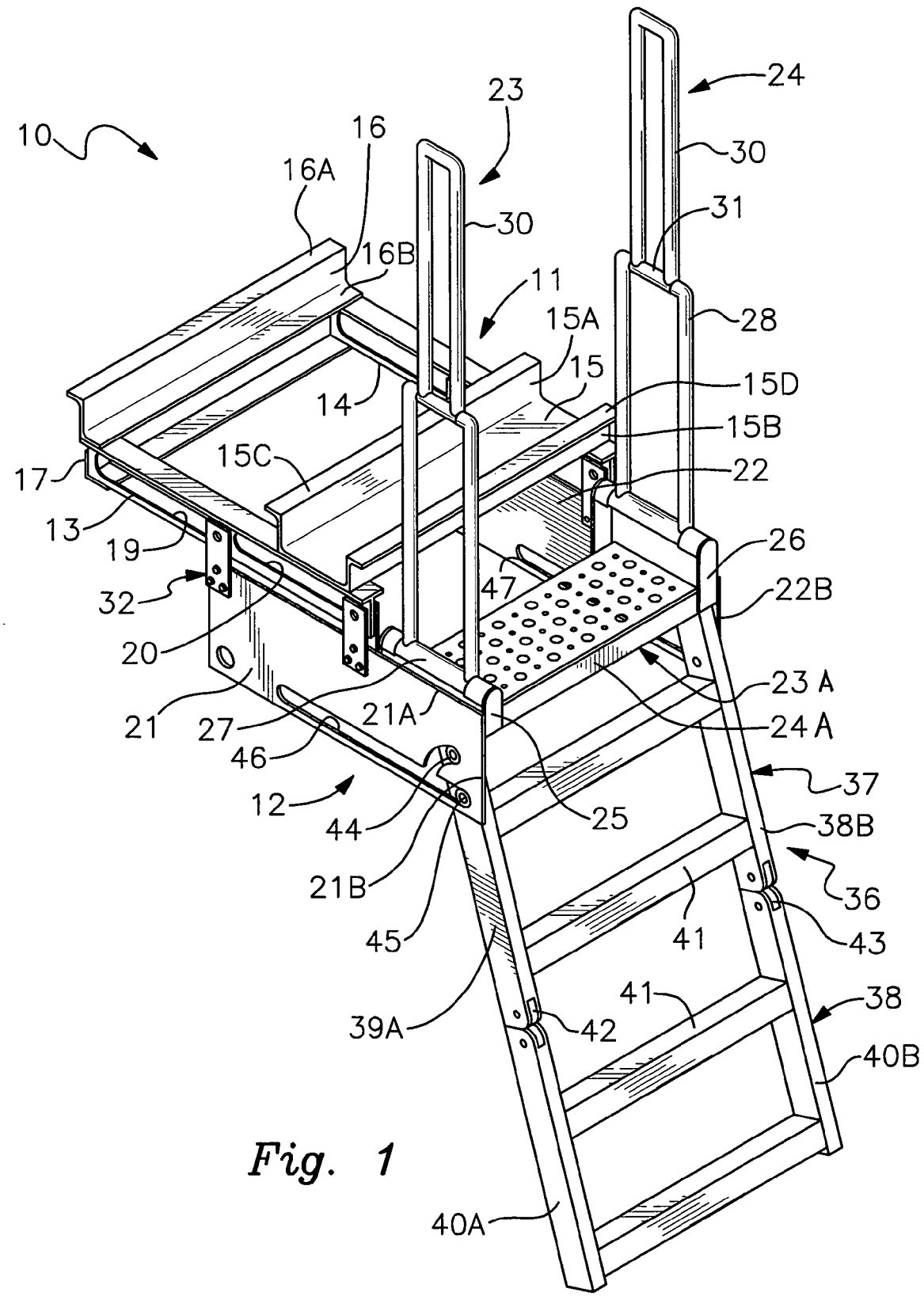
FIG. 1 is a perspective view of the ladder assembly of the invention in operable deployed position.
Figure 5:
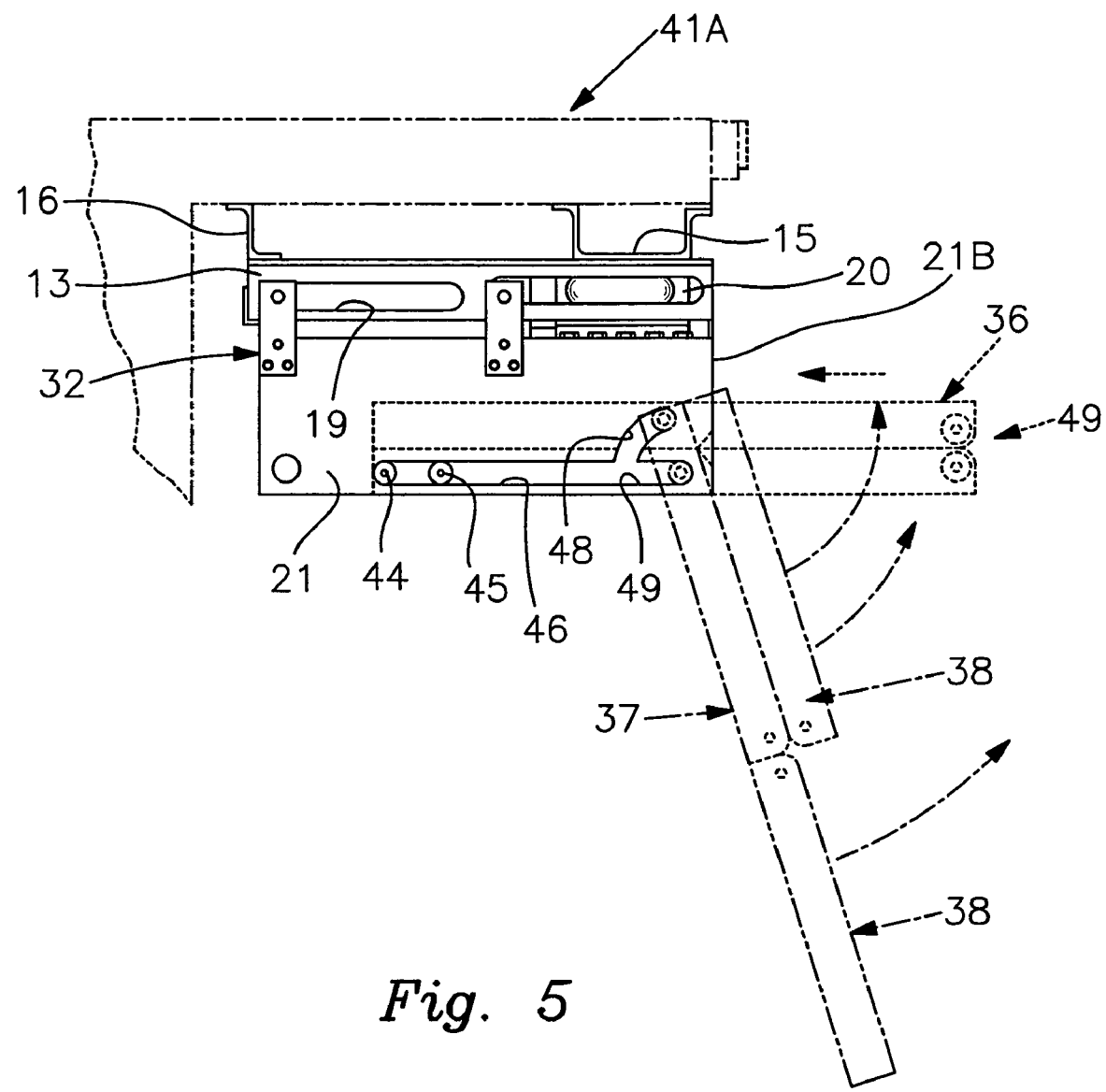
FIG. 5 is a side elevational view in closed storage position on a portion of the trailer to which it is attached shown in broken lines.
Figure 8:
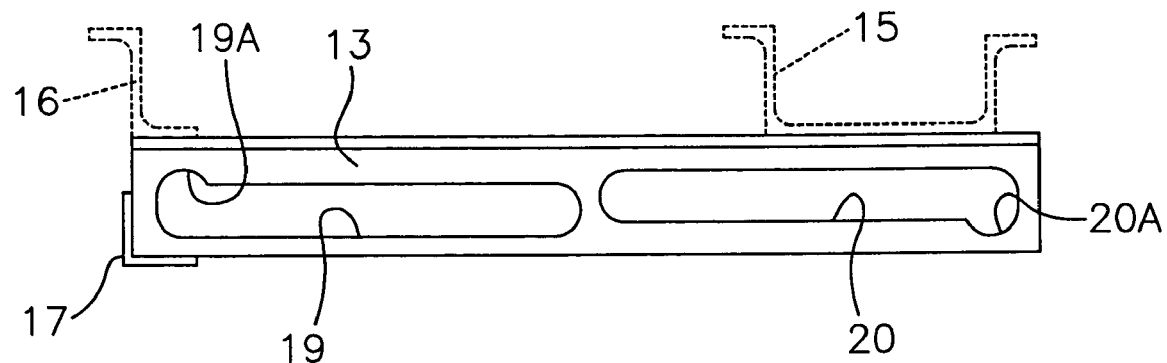
FIG. 8 is an enlarged side elevational view of the dual guide channel mounting member.

Referring to FIG. 1 of the drawings, a truck ladder assembly 10 of the invention can be seen having a fixed mounting support portion 11 and a movable ladder and storage support portion 12. The fixed mounted support portion 11 has a pair of oppositely disposed apertured slide track members 13 and 14 interconnected to one another by a pair of upstanding cross bracket members 15 and 16 and an angle iron element 17 at one end thereof. The slide track members are of an elongated cross-sectionally T-shaped with a pair of elongated guide openings 19 and 20 in each respectively. Referring to FIGS. 5 and 8 of the drawings, the respective guide slots 19 and 20 are vertically offset with respect to one another each with an enlarged end open portion at 19A and 20A respectively. The cross bracket member 16 has spaced offset opposing elongated upper lower flanges 16A and 16B for mounting purposes. The cross track member 15 has a pair of spaced parallel upstanding flanges 15A and 15B with respective right angularly extending mounting flanges 15C and 15D thereon.

Respective flanges 16A and 15C and 15D provide mounting surfaces in which mounting apertures can be made to match particular configurations of the mounting environment on which they are to be attached to as will be described in greater detail hereinafter.

The movable ladder and storage support portion 12 has a pair of oppositely disposed frame members 21 and 22 interconnected to one another by a platform assembly 23A. The platform assembly 23A has a generally U-shaped inverted landing bracket 24A secured between the frame members 21 and 22 along their respective upper edges 21A and 22A extending inwardly from their adjacent front perimeter edges 21B and 22B.

Figure 2:
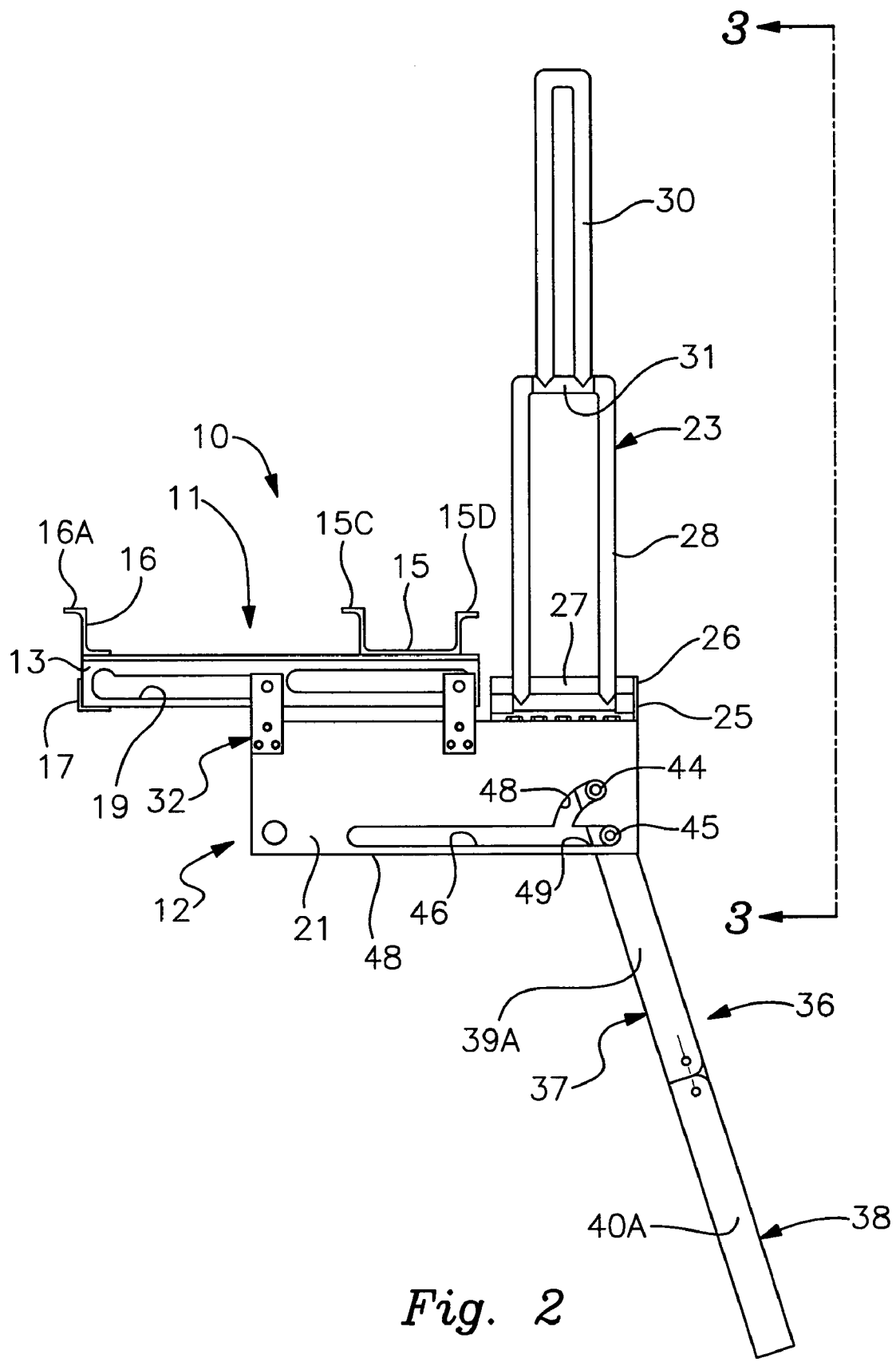
FIG. 2 is a side elevational view thereof.
Figure 7:
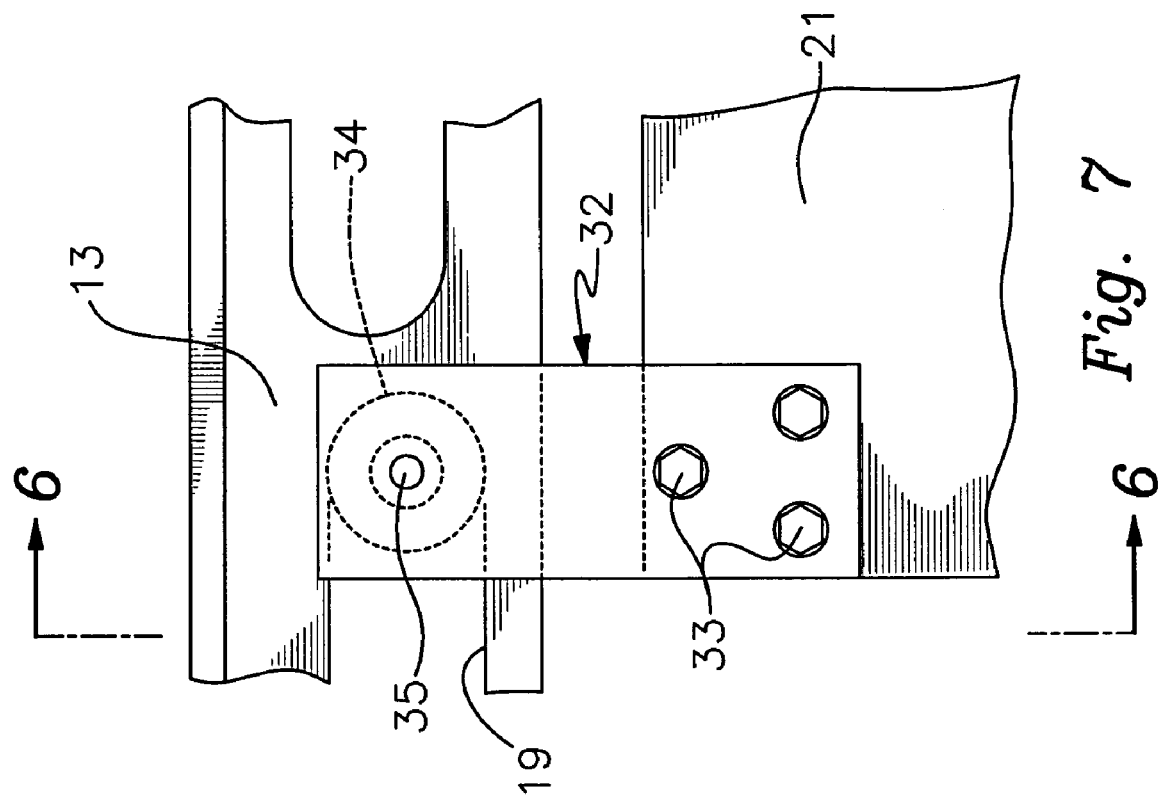
FIG. 7 is an enlarged partial side elevational view of the support bearing wheel slide assembly.
Figure 6:
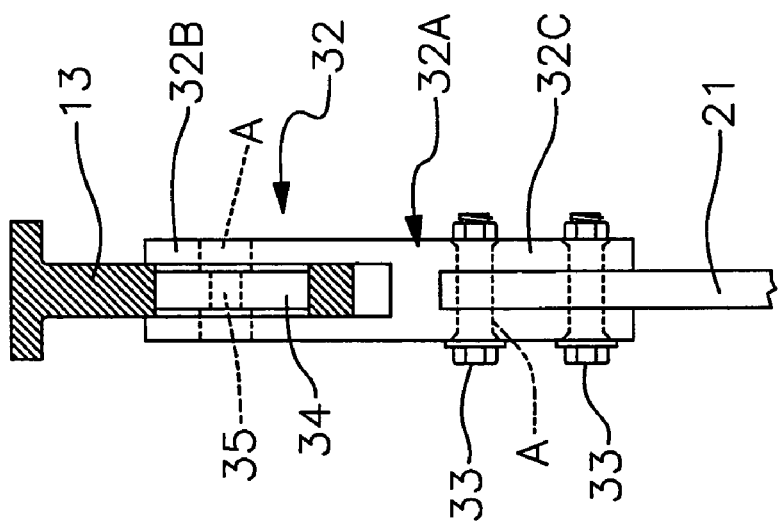
FIG. 6 is an enlarged partial sectional view of a support bearing wheel slide assembly on lines 6—6 of FIG. 1.

A pair of safety hand railing assemblies 23 and 24 are secured to and extend from oppositely disposed ends of the landing bracket 24. Each of the hand rail assemblies 23 and 24 are pivotally secured to the landing bracket 24 by a respective mounting socket pairs 25 and 26 having tubular elements 27 extending there between from which extend a pair of spaced parallel tubular rail members 28 interconnected at their free end 29. A second pair of tubular rail members 30 extend from a pivot sleeve 31 on the interconnected free end 29 of the hereinbefore described first rail member pair 28. The hand rail arrangement allows for folding of the second rail members 30 down between the first rail members 28 as seen in broken lines in FIG. 3 of the drawings. It will be seen that the mounting socket pair 26 is taller allowing the alternate folding of the first and second rail members 28 on one another in alternate fashion. Each of the frame members 21 and 22 are movably secured to the respective slide track members 13 and 14 by pairs of wheel bearing assemblies 32 as seen in FIGS. 6 and 7 of the drawings. Each of the wheel bearing assemblies 32 have an H-shaped mounting bracket 32A with an upper portion 32B and lower portion 32C. The upper portion 32B has aligned apertures A therein with a bearing wheel 34 rotatably positioned on the axle 35 extending there through. The wheel bearing assemblies are positioned within the respective guide openings 19 and 20 as seen in FIG. 2 of the drawings. The lower portion 32C has multiple aligned apertures A therein for registration over the respective frame members 21 and 22 and correspondingly aligned apertures therein by multiple fasteners 33.

It will be seen that the first set of wheel bearing assemblies 32 are secured to their respective frame elements 21 and 22 along their upper perimeter edges 21A and 21B inwardly from the respective back perimeter edges 21C and 22C and are aligned for engagement within respective guide slots 19 best seen in FIG. 8 of the drawings.

Correspondingly, the second wheel bearing set 32 are secured to the respective frame elements 21 and 22 along their upper perimeter edges 21A and 22B so as to be registerable within the enlarged end opening area of the guide slots 20.

Figure 3:
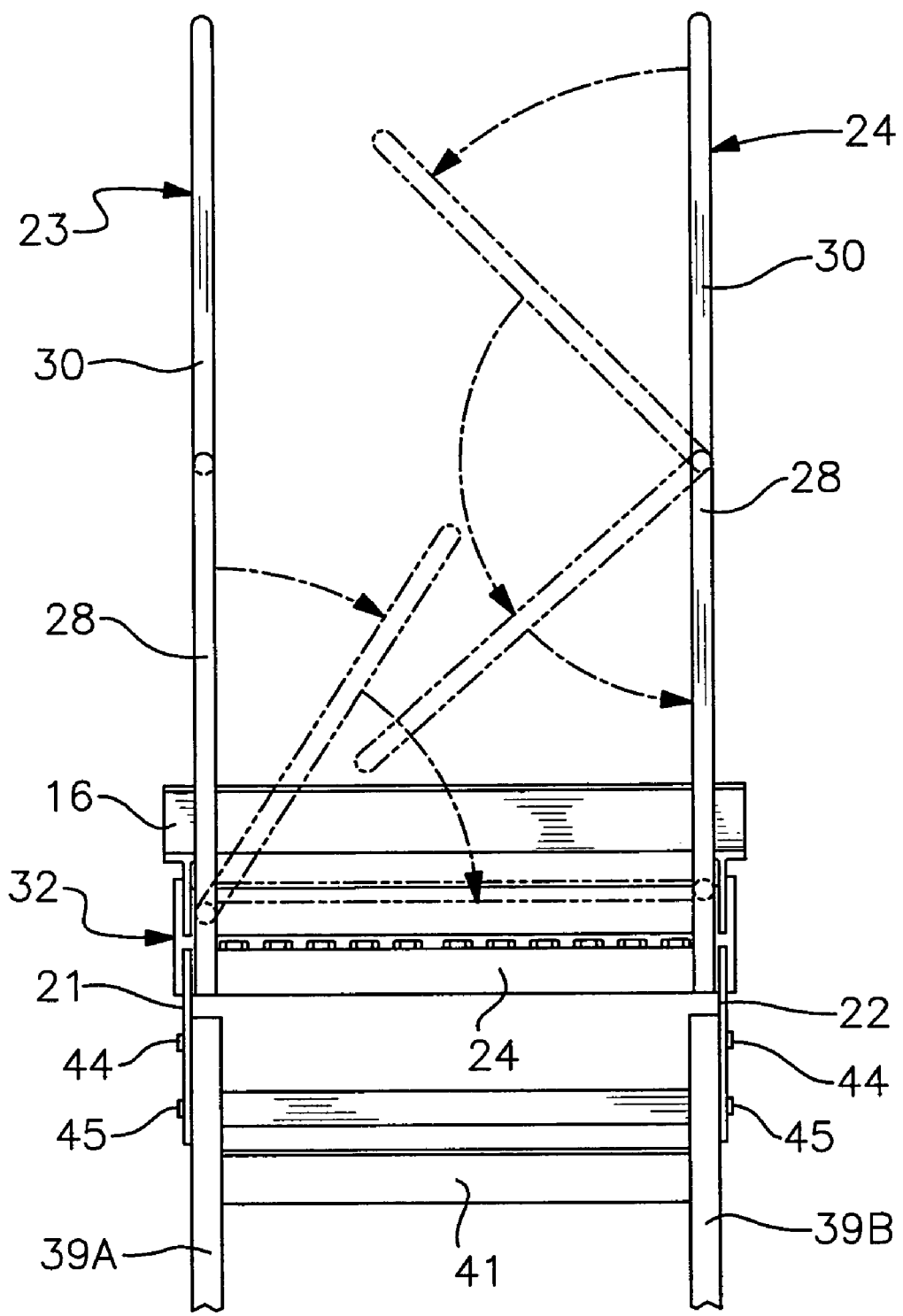
FIG. 3 is a partial front elevational view thereof with the hand rails folded for storage sequence illustrated in broken lines.
Figure 4:
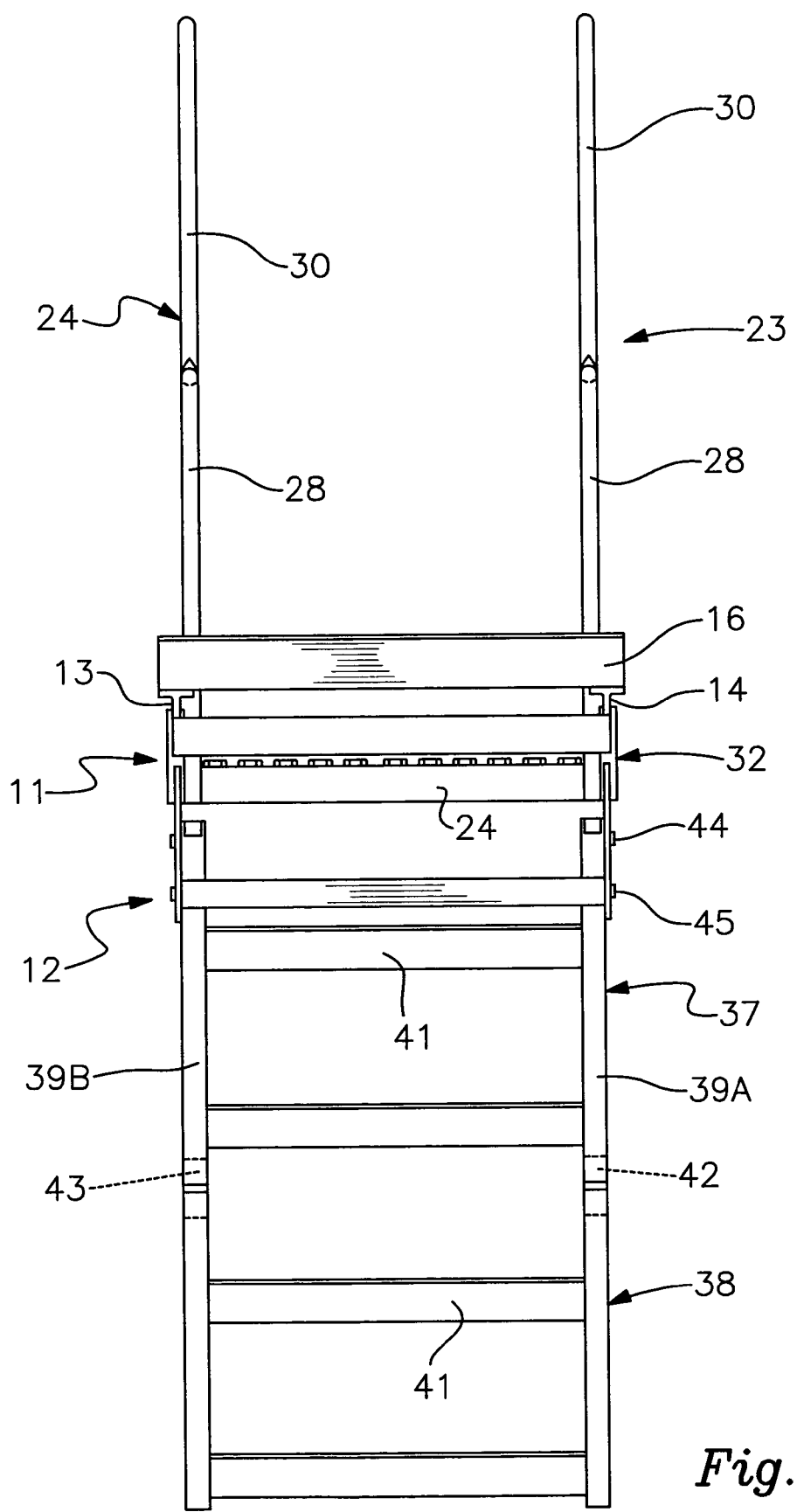
FIG. 4 is a rear elevational view of the ladder assembly of the invention in open operable position.

A folding stair rail and rung assembly 36 extends from the ladder storage portion 12 having a pair of stair segments 37 and 38 each with spaced parallel rail members 39A and 39B and 40A and 40B with multiple rungs 41 there between. Each of the rail member pairs 39A and 39B and 40A and 40B are pivotally interconnected at their abutting ends by respective apertured pivot blocks 42 and 43, best seen in FIGS. 1 and 2 of the drawings. The rails 39A and 39B of the upper ladder segment 37 have a pair of longitudinally spaced guide bearing assemblies 44 and 45 extending respectively there from which are registerable within respective retraction guide slots 46 and 47 in the frame elements 21 and 22 as seen in FIGS. 1–3 of the drawings. Each of the guide slots 46 and 47 extend in longitudinally spaced relation from the respective lower perimeter edges of the frame elements 21 and 22.

The guide slots 46 and 47 are bifurcated at one end defining curved upstanding portions 48 and 49 respectively.

In use, the bearing assemblies 44 and 45 upon deployment are positioned in the bifurcated end portions 48 and 49 of the slots 46 and 47 as seen in FIGS. 1, 2 and 5 of the drawings.

Alternately, to collapse and store the stair rail and rung assembly 36 the lower stair section 38 is pivoted upwardly and against the upper stair section 37 as seen in broken lines in FIG. 5 of the drawings and positioned in horizontal storage alignment at 49 with the guide bearing assemblies 44 and 45 tracking within their respective guide slots 46 and 47 sliding the collapsed stair assembly back between the respective frame elements 21 and 22 for storage, shown in broken dotted lines in FIG. 5 of the drawings.

To be stored, the handrail assemblies 23 and 24 have been folded down upon one another as hereinbefore described.

To complete the retraction and storage of the stair assembly, the frame elements 21 and 22 are then retracted under the support portion 11 by the respective wheel bearing assemblies 32 having been retracted back within the respective guide slot pairs 19 and 20 as hereinbefore described.

The support portion 11 of the truck ladder assembly 10 of the invention is secured under the trailer bed 41A shown in broken lines in FIG. 2 of the drawings by the respective engagement flanges 15C and 15D and 16A for permanent mounting.

Figure 9:
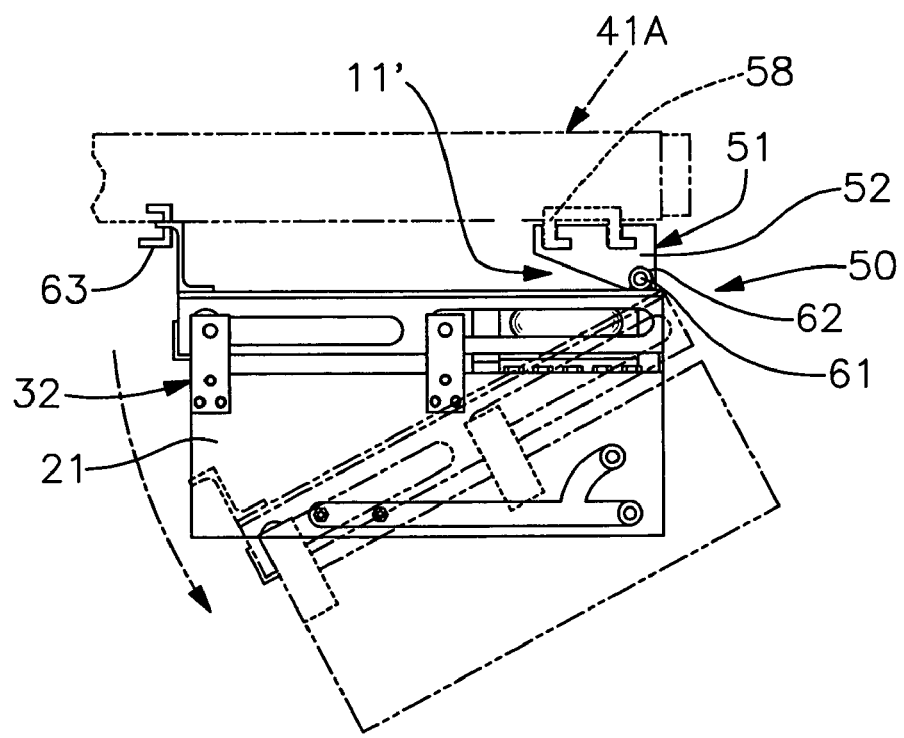
FIG. 9 is a side elevational view of an alternate form of the invention in which portions of the mounting assembly has been replaced with a slide pivot bracket.
Figure 10:
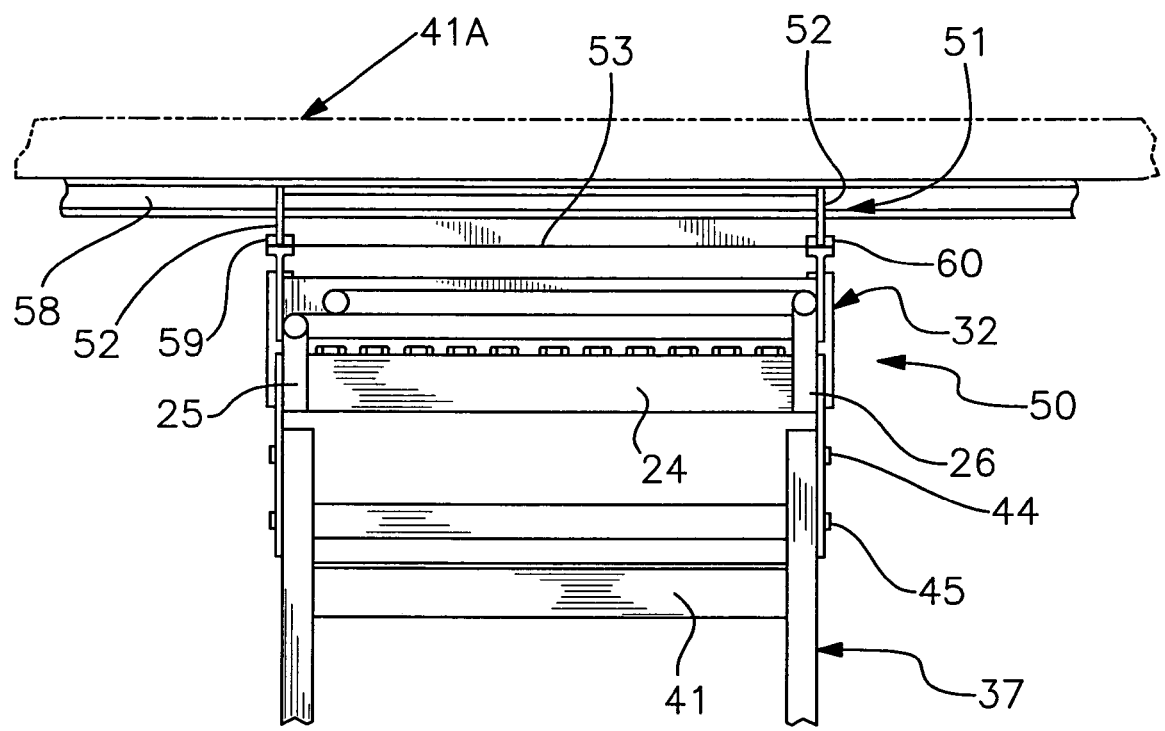
FIG. 10 is a partial front elevational view thereof.
Figure 11:
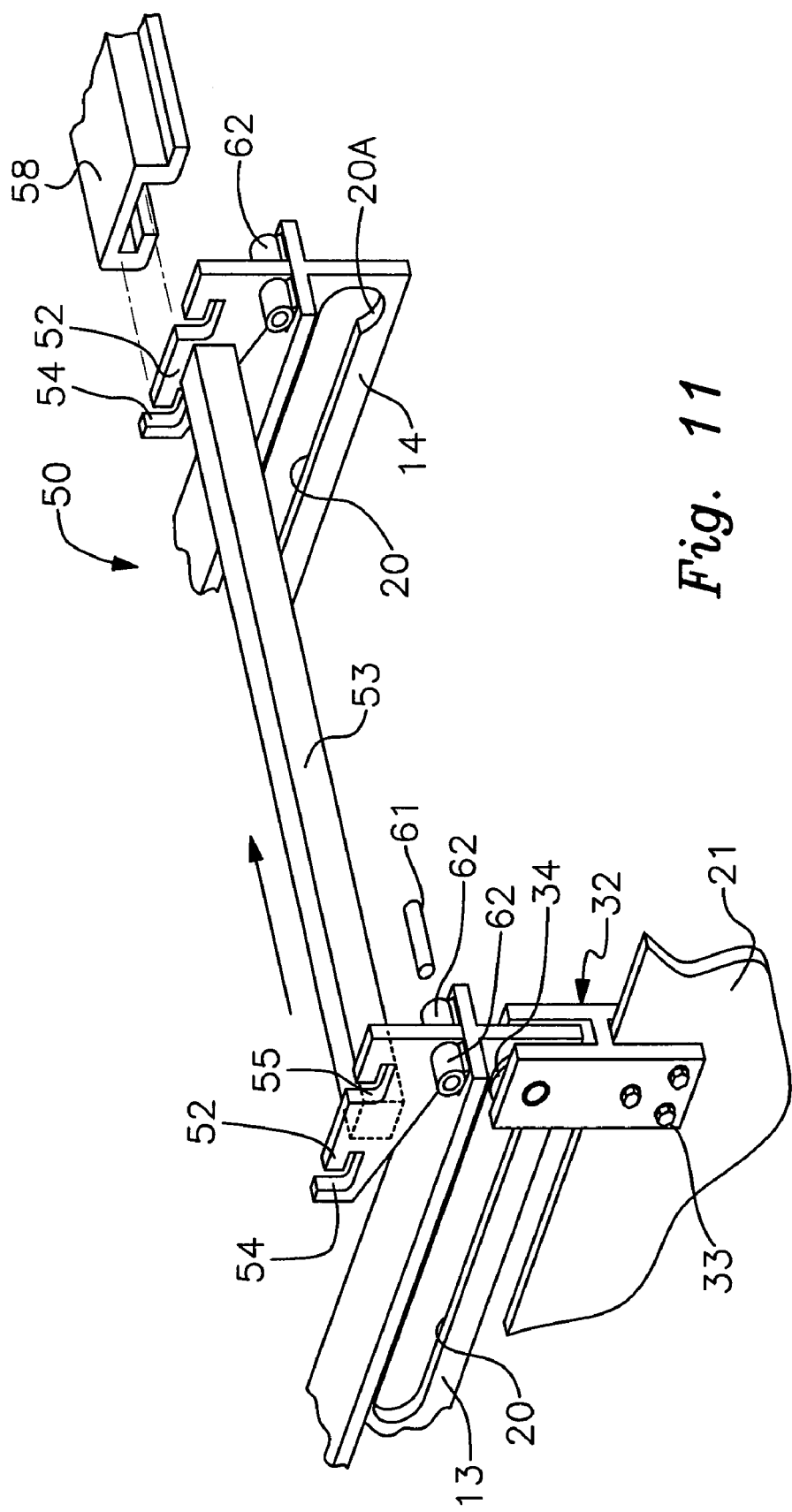
FIG. 11 is a partial perspective view of the slide bracket assembly illustrated in FIGS. 9 and 10.

Referring now to FIGS. 9, 10 and 11 of the drawings, an alternate movable slide mounting bracket assembly 51 can be seen. In applications where it is desirable to be able to rapidly reposition the truck ladder of the invention along the length of the trailer. An alternate mounting bracket assemblies 50 has a pair of mounting plates 52 interconnected to one another by a tubular element 53, best seen in FIG. 11. Each of the mounting plates 52 has longitudinally spaced engagement notches 54 and 55 inwardly of the respective upper perimeter edges. Each of the notches 54 and 55 have a contoured L-shaped configuration for registration onto an existing ratchet mounting rail 58 extending from the underside of the trailer as will be well understood by those skilled in the art and graphically illustrated in FIG. 11 of the drawings.

The fixed mounting support portion 11 of the ladder assembly 10 has been modified at 11' with the removal of the upstanding cross-support members 15 and 16 and replaced by pairs of aligned spaced apertured lugs 59 and 60 welded transversely to the respective upper surfaces of the slide track members 13 and 14 as best seen in FIG. 11 of the drawings.

In use, the slide mounting bracket assembly 51 is slid onto the end of the ratchet mounting rail 58 thus movably positioning the assembly 51 on the underside of the trailer.

The modified mounting support portion 11' is then lifted up and pivotally secured to the respective apertured plates 52 by positioning same between the respective spaced apertured lug pairs 59 and 60 and held in place by respective pivot pins 61 and 62 there through.

Due to the balance of the alternate mounting bracket assembly 51 wherein the effective mass of the assembly is forward of the respective pivot points when deployed the assembly will pivot upwardly engaging the underside of the trailer assembly and thus become parallel there with.

Retaining latches 63 are used to selectively secure the ladder assembly in position extending through apertured flanges 16A of the cross bracket 16 as hereinbefore described.

It will be evident from the above description that by releasing the latches 63 and pivoting the collapsed ladder assembly on the pivot pins it can then be slid along the ratchet mounting rail 58 to any position the user wishes and then locked in place by the above referred to latch configuration at its new location.

Referring now to FIGS. 12–16 of the drawings, an alternate handrail configuration 70 can be seen positioned on the truck ladder assembly 10 of the invention. The alternate handrail 70 replaces the original handrails 23 and 24 and has a pair of elongated tubular rail members 71 slidable secured to respective frame members 21 and 22.

Figure 15:
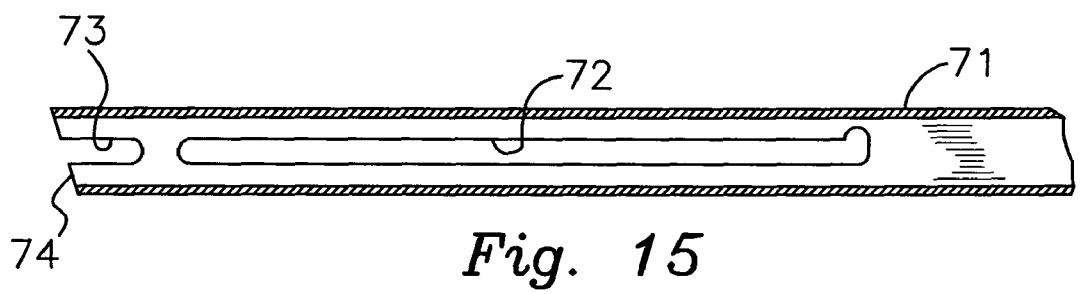
FIG. 15 is a sectional view of an alternate handrail tubular member.
Figure 16:
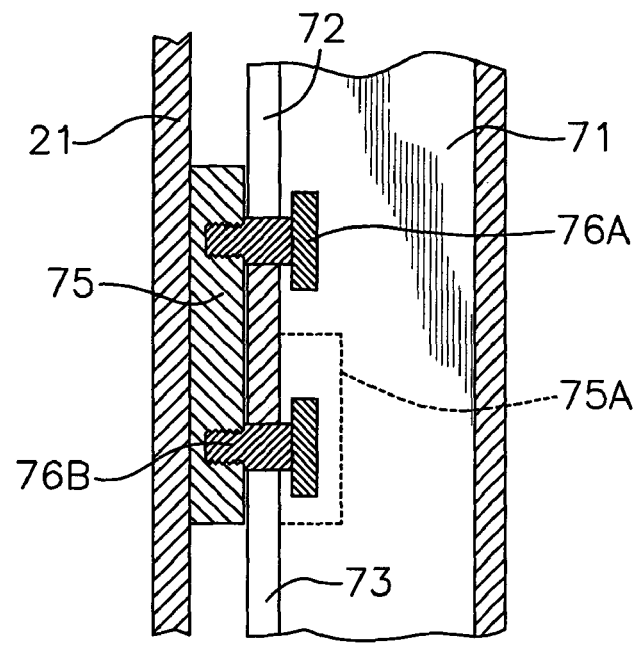
FIG. 16 is an enlarged partial cross-sectional view of the mounting and support plate for the alternate handrail assembly.

Each of the tubular rail members 71 has an elongated slot 72 within one sidewall and a longitudinally spaced and aligned retaining notch at 73 extending inwardly from a base end 74 as best seen in FIG. 15 of the drawings.

Figure 13:
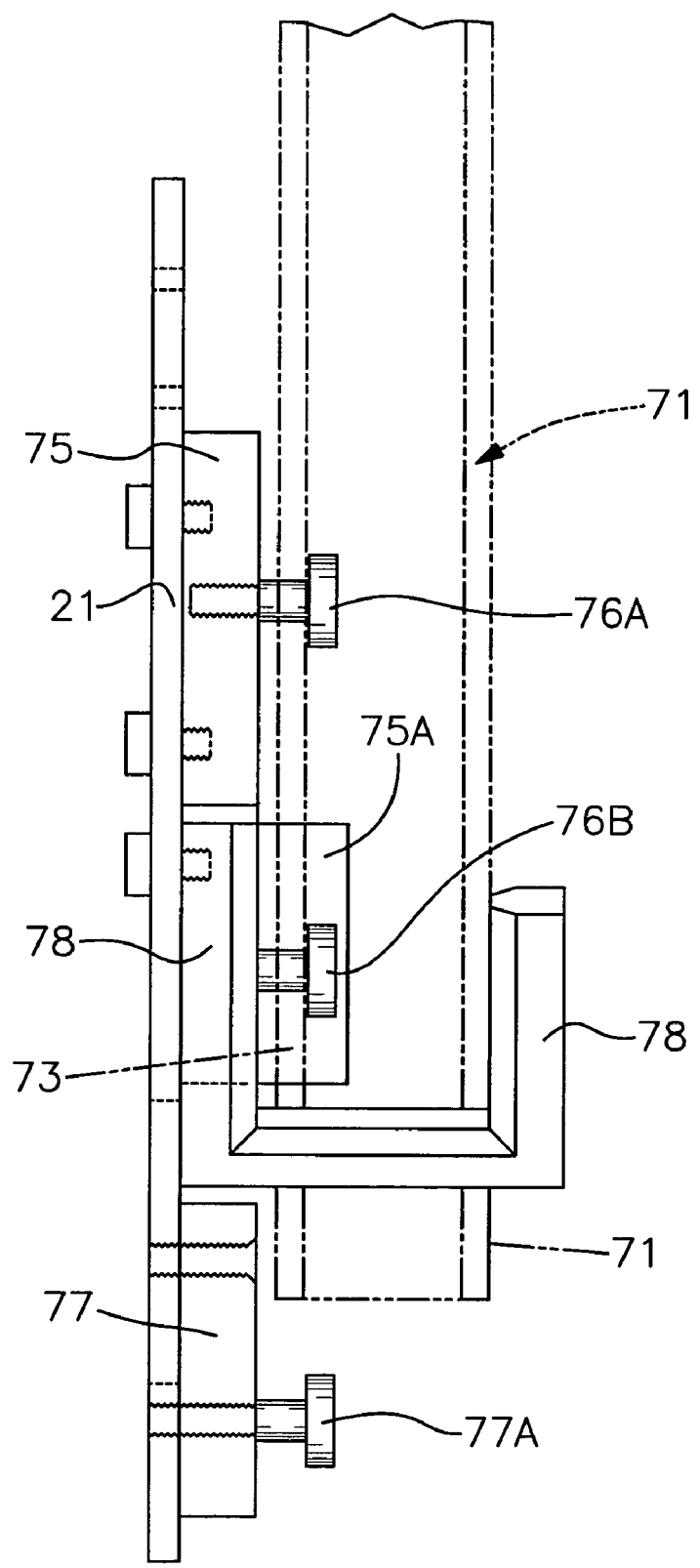
FIG. 13 is an enlarged partial end elevational view of the mounting assembly for the alternate handrails.
Figure 14:
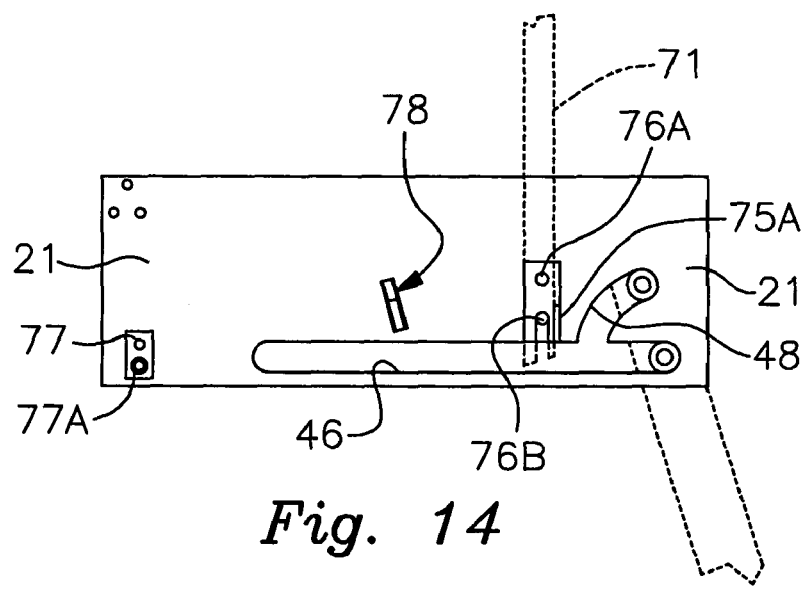
FIG. 14 is a partial side elevational view of the mounting plates for the alternate handrail assemblies.

Referring to FIGS. 13 and 14 of the drawings, each of the frame members 21 and 22 has a rectangular main rail mounting plate fitting 75 secured adjacent to the respective bifurcated slot portion 48. The rail mounting plat fittings 75 each have a stop flange 75A extending outwardly there from for engagement with the respective tubular member 71 and will be described in greater detail hereinafter. The mounting plate fittings 75 also have a pair of vertically spaced and aligned shoulder bolts 76A and 76B extending there from that are registerable respectively within the slot 72 and selectively in the notch 73 upon deployment.

Figure 12:
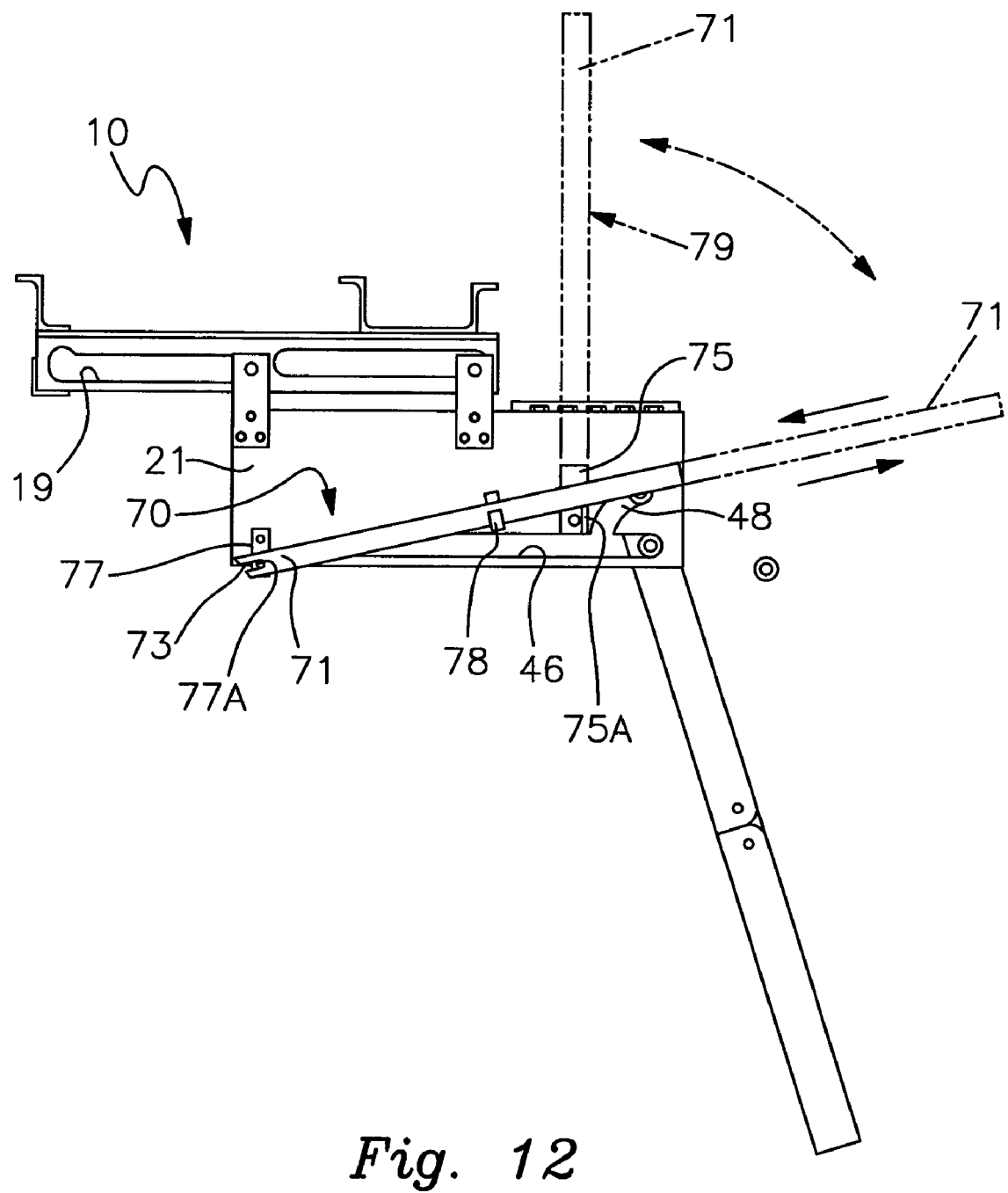
FIG. 12 is a side elevational view of an alternate form of a handrail assembly of the invention.

Storage retainment plate fittings 77 having an engagement bolt 77A extending there from are secured on the respective frame members 21 and 22 and horizontally aligned and spaced relation to the respective guide slots 46 and 47. Pairs of U-shaped guide plates 78 are positioned between their respective plate fittings 75 and 77 for guiding registration and support of the tubular rail members 71 in storage and during deployment. Referring now to FIGS. 12 and 14 it will be seen that the multiple mounting guide and support plate fittings 75, 77 and 78 hold the respective tubular rail members 71 in angularly disposed relation with the frame members 21 and 22 when not in use.

To use and deploy the handrail configuration 70, each of the rail members 71 are slid longitudinally forward on the shoulder bolt 76A and within the respective guide plate 78 with the engagement of the shoulder bolt 76A in the slot 72 as shown in broken lines in FIG. 12 of the drawings. The respective tubular rails 71 are then pivoted upwardly on said shoulder bolts 76A to vertical use position at 79 against the respective stop flanges 75A and then dropped down vertically onto the lower shoulder bolts 76B within the retaining notches 73 as previously described. In this position, the respective handrail configuration 70 perform a similar function as that of the safety handrail assemblies 23 and 24, but avoid ancillary issues of potential use conflicts in which it has been discovered when the handrail assemblies 23 and 24 are folded flat on top of the landing bracket 24 and not deployed act as a hindrance for the user to step thereon in certain situations.

There are also certain situations in which the user may not wish to deploy the handrail assemblies 23 and 24 as noted because of load configurations on the trailer bed and thus the alternate handrail configuration 70 are more practical in those applications.

While the foregoing description is illustrated and explanative of the invention, it will be evident to those skilled in the art that various changes and modifications may be made therein without departing from the spirit of the invention.

Therefore I claim:

1. A self-contained ladder assembly comprising, a support portion and a ladder portion, said support portion comprising a mounting frame having oppositely disposed slide track members with elongated guide track openings therein and cross brackets extending therebetween, one of said cross brackets having oppositely disposed notch interconnecting plates, said plates pivotally secured to respective slide track members, said ladder portion comprises, ladder support frame members slidably disposed on said mounting frame by wheel assemblies thereon registerable within respective guide track openings in said mounting frame, a platform interconnecting said ladder support frame members, upper and lower stair portions pivotally secured to one another and to said ladder support frame members, pairs of guide bearing assemblies on rail portions of one of said stair portions registerable within bifurcated guide slots in respective ladder support frame members, hand rail assemblies having elongated slots therein registerable on guide support bolts extending from said respective ladder support frame members, means for securing said handrail assemblies from a first position to a second extended use position, means for storing said upper and lower stair portions within said ladder support frame members.

2. The self-contained ladder assembly set forth in claim 1 wherein said slide track members have elongated guide tracks therein.

3. The self-contained ladder assembly set forth in claim 1 wherein said platform and rungs of respect stair portions have a textured surface thereon.

4. The self-contained ladder assembly set forth in claim 1 wherein said elongated guide track openings are vertically offset to one another along a longitudinal central axis and have respective end areas of increased transverse dimensions.

5. The ladder assembly set forth in claim 1 wherein said means for storing said upper and lower stair portions comprises, pivoting said upper and lower stair portions from a first extended position to a second folded position, sliding said upper and lower stair portions from said second folded position to a third storage position between respective ladder support frame members.

* * * * *